(12) United States Patent
Bauer et al.

(10) Patent No.: US 8,509,269 B2
(45) Date of Patent: Aug. 13, 2013

(54) METHOD FOR PRODUCING A CYLINDRICAL OPTICAL COMPONENT OF QUARTZ GLASS AND OPTICALLY ACTIVE COMPONENT OBTAINED BY SAID METHOD

(75) Inventors: Peter Bauer, Seligenstadt (DE); Karsten Braeuer, Bruchkoebel (DE); Marco Flach, Hanau (DE); Andreas Langner, Freigericht (DE); Richard Schmidt, Hammersbach (DE); Clemens Schmitt, Blankenbach (DE); Gerhard Schoetz, Aschaffenburg (DE); Matthias Stecher, Erlensee (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 166 days.

(21) Appl. No.: 12/998,968

(22) PCT Filed: Dec. 2, 2009

(86) PCT No.: PCT/EP2009/066230
§ 371 (c)(1),
(2), (4) Date: Jul. 22, 2011

(87) PCT Pub. No.: WO2010/069768
PCT Pub. Date: Jun. 24, 2010

(65) Prior Publication Data
US 2011/0274129 A1 Nov. 10, 2011

(30) Foreign Application Priority Data
Dec. 20, 2008 (DE) .......................... 10 2008 063 829

(51) Int. Cl.
*H01S 3/30* (2006.01)
(52) U.S. Cl.
USPC ...................... 372/6; 372/39; 372/40; 372/64
(58) Field of Classification Search
USPC ................................................ 372/6, 39, 40
See application file for complete search history.

(56) References Cited

U.S. PATENT DOCUMENTS 3,540,870 A * 11/1970 Li ..................................... 65/529
5,048,026 A    9/1991 Shaw et al.
(Continued)

FOREIGN PATENT DOCUMENTS

DE    28 44 129 A1    10/1978
EP    0 244 135 A1    11/1987
(Continued)

OTHER PUBLICATIONS

Espacenet English language abstract for JP 7081960 (A), Mar. 28, 1995.

(Continued)

*Primary Examiner* — Dung Nguyen
(74) *Attorney, Agent, or Firm* — Tiajoloff and Kelly LLP (57) ABSTRACT

Cylindrical optical components of quartz glass are known, which have an inner zone made of an inner zone glass, which extends in the direction of the longitudinal axis and is surrounded by a jacket zone made of a jacket zone glass, the average wall thickness thereof varying at least over a part of its length in the direction of the longitudinal axis of the component. The aim of the invention is to provide a method that allows a simple and cost-effective production of such an optical component from quartz glass. A method is proposed according to the invention, comprising the following method steps: (a) providing a first parison made of an inner zone glass, which has a first contact surface on the end face, said contact surface having a conical external contour; (b) providing a second parison from the jacket zone glass; (c) embedding the contact surface with a conical external contour into the jacket zone glass and welding the contact surface to the jacket zone glass, thereby forming a composite parison which has a cone-shaped inner zone area of inner zone glass in a contact area, said inner zone area being surrounded by a jacket zone area having the shape of an inner cone; and (d) elongation of the composite parison to form the optical component or a preproduct of the component.

18 Claims, 5 Drawing Sheets

(56) References Cited

U.S. PATENT DOCUMENTS

| | | | |
|---|---|---|---|
| 5,086,433 A | | 2/1992 | Pocholle et al. |
| 5,878,178 A | * | 3/1999 | Wach .................. 385/55 |
| 6,021,649 A | * | 2/2000 | Sanghera et al. ........... 65/495 |
| 6,776,439 B2 | | 8/2004 | Albrecht |
| 7,386,210 B2 | | 6/2008 | Farroni et al. |
| 2002/0121746 A1 | | 9/2002 | Albrecht |
| 2004/0239045 A1 | | 12/2004 | Albrecht |
| 2007/0089462 A1 | | 4/2007 | Farroni et al. |

FOREIGN PATENT DOCUMENTS

| | | |
|---|---|---|
| JP | 781960 A | 3/1995 |
| JP | 9227149 A | 9/1997 |
| JP | 11021142 A | 1/1999 |

OTHER PUBLICATIONS

Espacenet English language abstract for JP 9227149 (A), Sep. 2, 1997.

Espacenet English language abstract for JP 11021142 (A), Jan. 25, 1999.

* cited by examiner

METHOD FOR PRODUCING A CYLINDRICAL OPTICAL COMPONENT OF QUARTZ GLASS AND OPTICALLY ACTIVE COMPONENT OBTAINED BY SAID METHOD

The present invention relates to a method for producing a cylindrical optical component of quartz glass, comprising an inner zone extending in the direction of a longitudinal axis and made from an inner zone glass, which zone is clad by a cladding zone made from a cladding zone glass, the mean wall thickness of which is varying at least over part of the length thereof in the direction of the longitudinal axis of the component.

Moreover, the present invention relates to a cylindrical blank for producing an optically active component, which comprises a longitudinal axis, at least one core extending along the longitudinal axis and consisting of an optically active material, a pump light layer extending along the core, and a cladding layer surrounding the pump light layer and having a lower refractive index than the pump light layer, the pump light layer having a decreasing wall thickness along an output path.

TECHNICAL BACKGROUND

Side pumped optically active components in rod or fiber form are e.g. used as high-power lasers or in communications technology as optical fiber amplifiers with a laser active core and a pump cladding surrounding the core. Apart from lasers, the term "optically active component" also encompasses optical amplifiers and so-called superluminescent sources.

Fiber amplifiers can compensate losses in optical waveguides during optical data transmission in that laser light is injected or coupled into the fiber core by so-called "optical pumping", with the laser light exciting the core zone. The light pulse running through the fiber core additionally absorbs energy from the excited ions and is thereby amplified.

Alternatively, the laser active substances can also be excited by the injected pump light as such to emit laser light, as is the case in high-power lasers in fiber or rod form.

The laser active material contains, for instance, crystalline Nd:YAG or it consists of quartz glass containing dopants that effect an output or amplification of laser radiation in the host material quartz glass. The dopants are normally rare-earth cations (lanthanoids) or cations of the so-called transition metals.

To ensure an adequate pump light action also after a certain penetration depth, a particularly high energy density of the pump light radiation is needed in the input region. This is accompanied by a degradation of the core region due to heat action and photodarkening. Moreover, the high energy density of the pump light in the input region on the one hand and the exponential decrease in the pump light power on the other hand lead to undesired non-linear effects.

These drawbacks are avoided by side pumped, optically active components and laser systems according to the aforementioned type in which the pump light is not directly coupled into the laser active core, but is coupled via the cladding surface into the core. Due to the length of the fiber the cladding surface is many times greater than the fiber face. This allows the in-coupling of high excitation energy without impairment of the core region of the optically active component.

Such an optically active component in the form of a side pumped laser is known from U.S. Pat. No. 5,048,026 A. Described is a fiber amplifier comprising a cylindrical laser-active core of Nd:YAG and an output end for laser radiation that is surrounded by a sleeve-shaped pump jacket or cladding of quartz glass. The pump cladding is conically shaped in a front longitudinal region, so that its thickness is decreasing towards the output end and terminates in a rear cylindrical part that ends flush with the output end of the core. The pump light is injected into the pump cladding on the face side opposite the output end and is reflected back and forth between the cladding areas of the pump cladding, thereby passing through the laser-active core. To ensure this, the pump cladding has a refractive index greater than the refractive index of the surroundings (e.g. air), but smaller than the refractive index of the laser active core. In the conical part of the pump cladding, the angle relative to the cladding areas is here getting steeper and steeper with each reflection, so that the pump light is focused onto the laser active core in the cylindrical region.

A similar laser system is also known from U.S. Pat. No. 5,086,433 A. The laser system comprises a quartz glass element that serves to optically pump a laser rod which is inserted into a central bore of the quartz glass element. The quartz glass element tapers in propagation direction conically and it is provided with a mirror coating on the outside.

Several laser diodes are used as pump light sources, which radiate at different radial positions on the face side into the quartz glass element. Depending on the radial position of the laser diode, the pump light rays impinge at axially different positions on the mirror coating and are reflected from there into the laser rod.

The pump light injected into the quartz glass element has a substantially annular intensity distribution, and it is also possible, depending on number and position of the laser diodes, to distribute the injected pump light over the length of the laser rod more or less evenly. The device itself and the adjustment of the components are however very complicated.

DE 28 44 129 A1 describes a similar device for optically pumping a laser rod. The device comprises a side pumped Nd:YAG laser and a pump light source. The laser rod is surrounded by a cladding and the latter, in turn, by a sleeve having an inner mirror coating. The cladding consists of a material having a lower refractive index than the laser rod, and it tapers conically in light propagation direction. On the output end a small glass plate is arranged which reflects the pump light and also permits the output or out-coupling of laser light.

The pump light injected by the pump light source from its broad end on the face side into the cladding is reflected at a specific angle on the mirror-coated sleeve and then impinges on the cladding surface of the laser rod.

The manufacture of a laser component with a conically tapering pump light cladding of glass does however pose some problems. Such a component must e.g. be produced in that the pump light cladding is mechanically treated from the outside or in that a cylindrical component is softened zone by zone and elongated in this process, whereby during elongation the drawing rate is continuously increased, so that the outer diameter of the drawn-off strand is continuously decreasing. This procedure is troublesome and requires a complicated control process, and it is particularly not suited for setting a steep cone angle (e.g. more than 10°).

Moreover, a conical pump light cladding will yield a laser component with a tapering outer diameter if no countermeasures are taken. A tapering outer diameter, however, has drawbacks. For instance, cooling over a solid body turns out to be more difficult to realize than cooling at a constant outer diameter, and the customizing of the laser component, particularly a laser fiber, is difficult. Therefore, despite a conical pump cladding, a cylindrical outer cladding of the optical component would be desirable.

WO 2006/049186 A1 discloses a method for producing a preform with a conical core in that first of all a cylindrical preform with a core region and a cladding region, each with a constant diameter, is conically elongated (as explained above), so that a semifinished product is first obtained with a conical core region and a conical cladding region. Subsequently, the outer diameter of the semifinished product is ground at the expense of the cladding region to a constant dimension. The resulting cylinder comprises a conical core region and a reversed conical cladding region.

Grinding entails a lot of work and great loss of material.

JP 11021142 A discloses a different method for producing a cylindrical optical component with a conical core region and a reversed conical inner cladding region. First of all, a cylindrical core rod with a cylindrical core region and a cylindrical inner cladding region is produced. Subsequently, the inner cladding region is removed to obtain a conical shape, resulting in a semifinished product having a conical outer-diameter extension. The conical semifinished product is drawn off in an elongation process to obtain a cylindrical semifinished product with a constant outer diameter. Thereafter, the semifinished product comprises a conical core region and a reversed conical cladding region. The cylindrical semifinished product is subsequently provided with an additional outer cladding and drawn into a fiber.

The known methods require great efforts in terms of work and time for producing a cylindrical outer diameter of the optical component.

TECHNICAL OBJECT

It is the object of the present invention to provide a method which permits a simple and inexpensive manufacture of a cylindrical optical component made of quartz glass, which is provided with a radial layer exhibiting a varying wall thickness at least over part of its length.

Furthermore, the present invention is based on the object to provide a blank for an optically active component in which a minor impairment of the core zone in the area of the input point of the pump light and the occurrence of non-linear effects caused by high absorption of the pump light can largely be avoided, and wherein a high degree of efficiency of the pump light is attained.

As for the method, this object is achieved according to the invention by a method that, starting from a method of the aforementioned type, comprises the following method steps:
(a) providing a first preform made from the inner zone glass, comprising on a face side a first contact area shaped in the form of an external cone;
(b) providing a second preform made from the cladding zone glass;
(c) embedding the contact area (13) shaped in the form of an external cone in the cladding zone glass and welding the contact area (13) to the cladding zone glass so as to form a composite preform (18) which in a contact area (16) comprises a conical inner-zone area made of the inner zone glass, which is surrounded by a cladding zone area with internal cone shape; and
(d) elongating the composite preform to obtain the optical component or a pre-product of the component.

The method aims at a cylindrical optical component (or a pre-product thereof) which at least over part of its length comprises an inner zone of a wall thickness varying in the direction of the cylinder axis and which at the same time has a cylindrical form if possible.

The optical component is e.g. a preform for drawing optical fibers or an optical fiber for light conduction. Or it is a laser in the form of a rod, a tube, or a fiber, said components typically comprising at least one laser active zone.

In the known methods an inner zone is formed with a varying wall thickness by treating the cylindrical outer surface of a semifinished product or by axially inhomogeneous deposition of inner zone material on a cylindrical outer surface. The reconstitution of the cylindrical shape requires one or several additional method steps. By contrast, the method according to the invention employs a welding process in which two prefabricated preforms are welded to each other such that they penetrate into each other on the face side. To this end the first preform is configured on the face side with a contact area in the shape of an external cone that can be embedded into the cladding zone glass of the second preform, for instance in that it penetrates into the cladding zone glass. In only one operation it is thereby possible to produce a varying wall thickness of the cladding zone and a reversely varying wall thickness of the inner zone via the penetration depth of the external cone from the inner zone glass into the cladding zone class. The area of the mutual penetration of cladding zone glass and inner zone glass will be called "contact area" hereinafter.

The contact area shaped as an external cone, which is embedded into cladding zone glass, is welded to the cladding zone glass. This yields a melt connection in which the cladding zone glass abuts on the external cone of the inner zone glass in a form-fit manner and is fused therewith.

The geometry of base area and cladding of the external cone define the axial extension of inner zone and cladding zone in the contact area. In the simplest case the wall thickness of the inner zone is linearly decreasing in one direction, resulting in a conical extension of the inner zone in the axial longitudinal section along the cylinder axis of the component. Depending on the shape of the external cone cladding, one obtains other axial wall thickness profiles, e.g. with an exponential or stepwise decrease in the wall thickness of the inner zone in the direction of the cylinder axis. A taper resembling a drawing bulb with a so-called taper form should specifically be mentioned. For the sake of simplicity the invention will be explained hereinafter in an exemplary way with reference to a conical wall thickness profile that is also to represent other wall thickness profiles. Specifically, the term "cone structure" for describing the geometrical interaction of cladding zone glass and inner zone glass will be used in a general form hereinafter.

The base area of the outer cone of the first preform depends on the function of the optical component to be produced. In the simplest case the base area is circular, but also oval, polygonal base areas and particularly base areas with a so-called "D" shape (or a D-shape at both sides, which is also called double-D-shape) are suited for special applications, which will be explained further below in more detail.

The composite preform obtained by welding on the face side and the mutual penetration of first and second preform is normally subjected to further treatment steps; the addition of further glass zones in the inner or outer region of the composite preform should here specifically be mentioned. Following an elongation process, or after several elongation processes, one obtains the optical component which in a longitudinal section comprises a cone structure deriving from the contact area of the former composite preform, in which an inner zone of varying thickness and an adjoining cladding zone of reversely varying thickness are provided.

The method according to the invention is particularly suited for producing side pumped lasers in fiber, tube or rod form with one or plural laser active regions, wherein pump light is injected into a pump light zone that adjoins a laser active region directly or separated via a separation zone and tapers or expands in the direction of the longitudinal axis of the fiber or rod.

Advantageously, the second preform comprises a second contact area, wherein the formation of the composite preform comprises a joining of first and second contact area.

Joining is carried out mechanically, resulting in a mechanical joined composite from which the composite preform is made by subsequent welding of the contact surfaces, or the joining operation is carried out thermally, with the contact surfaces being welded at the same time.

As a rule, bubbles on the boundary between inner zone glass and cladding zone glass are not desired. Therefore, it is provided in a particularly preferred method variant that during joining a space between first and second contact area is evacuated.

When the contact surfaces are joined, a negative pressure is applied. For this purpose either the first preform and/or the second preform is provided with a through hole which ends at the respective contact surface and is thus in fluid communication with the space during welding. The through hole is here preferably arranged such that it is closed, if possible, not before the end of the welding process, so that the negative pressure will be operative until the end.

The external cone of the first preform can here be used for sealing the space. This is done in a preferred variant of the method in that during joining of the preforms the cone cladding of the first preform sealingly abuts on a surrounding edge of the second preform.

To this end the second preform is provided on the face side with a conical recess which ends on the face side in the form of a surrounding edge. The external cone of the first preform is sufficiently large, so that when the preforms are joined it will abut with its cone cladding on the surrounding edge. The recess of the second preform is configured to be so deep that the cone tip of the external cone does not impinge on it before the seal is formed via the abutment of the outer cladding on the surrounding edge.

The preforms are welded to each other e.g. on a lathe-like device by means of which the preforms are rotatable about a joint axis of rotation and axially displaceable in the direction of the axis of rotation. Prior to welding the contact surface of the second preform is softened such that the external cone of the first preform can penetrate into the softened cladding zone glass, or that the softened cladding zone glass collapses onto the outer cone of inner zone glass. In these cases the contact surface of the second preform need not be adapted to the form of the penetrating external cone; e.g. it may be flat or tubular. Optionally, the cladding zone glass displaced during the penetration of the external cone can form a bead-like thickening around the contact area. The thickening can be compensated and avoided by a molding tool directly during the welding process, or it is subsequently removed by mechanical treatment. In a preferred method variant, however, it is intended that the contact surface of the second preform has a recess that is preferably formed as an inner cone.

Due to the recess of the second preform on the face side, the external cone is centered to some extent when the two preforms are joined. Moreover, the mass of the cladding zone glass to be displaced is smaller so that the bead formation will be minor and a minor softening of the cladding glass zone will suffice. To be more specific, it is not absolutely necessary, but preferred, that the form of the recess is adapted to the external cone of the first preform. With a good fit, cladding zone glass will not be displaced during the welding process or it will be displaced to a minor degree at the most, and there will be no significant deformation in the contact area. As a consequence, a comparatively minor softening in the contact area is required which is adequate for welding the contact surfaces. An exact and easily reproducible cone structure is thereby obtained. In a method variant in which during welding a negative pressure is generated and maintained in the contact area (as has already been explained above), it is recommended that a through hole through which vacuum can be applied should end in the recess of the second preform.

The recess or the contact area shaped as an internal cone, respectively, is preferably formed by mechanical treatment.

Mechanical treatment comprises drilling, milling or grinding. For smoothing and eliminating wear a chemical etching process may be of help. In the simplest case the recess is e.g. configured as a blind hole, but as a rule it is adapted to the external cone shape at least approximately.

For joining the preforms on the face side the first preform thus possesses the conical bulge on the face side, the bulge enclosing a mean cone angle of at least 25° with the longitudinal axis of the cylinder, and the face side of the second preform is preferably adapted to the external cone shape in that it has an internal cone with a mean cone angle of at least 25°.

In a second and equally preferred method variant it is intended that the recess is formed by a hot forming process.

In the hot forming process at least the region of the second preform on the face side is softened and the recess on the face side is embossed by means of a molding tool, e.g. by means of a graphite stamp. After the molding tool has been removed, the near-surface area of the recess fuses so that a particularly smooth surface is thereby obtained with little efforts.

Preferably, a fluorine-doped quartz glass is used as the cladding zone glass.

Fluorine can also be introduced in high concentrations of up to 9% by wt., preferably in the range between 1-5% by wt., relatively easily and homogeneously into quartz glass. As is generally known, the doping of quartz glass with fluorine results in both a decrease in the refractive index and a lowering of the viscosity. Due to the decrease in the refractive index the cladding glass zone contributes to the light conduction. The reduction of its viscosity has the effect that the cladding zone glass in the welding process is softer despite the same temperature than the inner zone glass, which facilitates the penetration of the external cone into the softer cladding zone glass and the reproducible manufacture of a predetermined cone structure.

It has turned out to be particularly advantageous when the first preform and the second preform are each configured as cylinders.

For welding together the cylindrical preforms are joined in the direction of their joint longitudinal cylinder axis. This can e.g. be carried out on a lathe where the preforms are each held by means of a lathe chuck. This permits a particularly exact and reproducible joining of the preforms. Preforms of the same outer diameter thereby yield a composite preform with a continuously identical outer diameter.

Advantageously the contact surface of the first preform shaped in the form of an external cone is produced by mechanical treatment.

With the mechanical treatment, for which grinding methods are mainly appropriate in the instant case, one will obtain an exact geometry of the contact area shaped in the form of an external cone by just taking minor efforts.

Alternatively, it has turned out to be advantageous when the contact area of the first preform shaped in the form of an external cone is produced by a hot forming process.

The contact area shaped in the form of an external cone is here produced in that the face side of the first preform is softened and formed into the desired external shape by means of a tool, such as a graphite mold. When the graphite mold is removed, the external cone obtained will fuse on the surface, resulting in a particularly smooth surface.

It has turned out to be advantageous when the contact area of the first preform shaped in the form of an external cone is provided with a rounded-off cone tip.

The rounded-off cone tip shows a higher mechanical stability than a sharp tip and is therefore subjected to less deformation when penetrating into the face side of the second preform, which has an advantageous effect on the reproducibility and dimensional stability of the cone structure in the contact region.

In this context it has also turned out to be advantageous when undoped quartz glass is used as the inner zone glass. As a rule, undoped quartz glass exhibits a higher viscosity than doped quartz glass.

If the cladding zone is provided with an internal cone corresponding to the external cone, the preforms can be joined in a cold state and the contact areas adjoining one another can then be welded. As a rule, however, it is more advantageous that at least the second preform in the region of the second contact area is softened already when the parts are pressed together.

In the welding process, preferably two preforms are uniformly heated in the contact region and at least the second preform is softened in this process to permit fusion with the external cone of the first preform.

Furthermore, it has turned out to be useful when the composite preform is provided with at least one inner bore for receiving a core rod and is equipped with a core rod prior to elongation.

The inner bore or the inner bores are formed mechanically, namely after the cone structure has been finished in the composite preform. This avoids an elongation process which results in an irregular axial diameter profile of the core region, which is normally not desired. Moreover, it is possible to form mechanical bores of a high dimensional stability. A core rod is inserted into the at least one inner bore. This may be an optical core rod for lightwave conduction or a rod consisting of a laser active glass. A central core glass region may here be surrounded by an inner cladding region each time.

Furthermore, it has turned out to be advantageous when prior to elongation the composite preform is clad with a layer consisting of fluorine-doped quartz glass.

The layer of fluorine-doped quartz glass is e.g. produced by depositing a corresponding quartz glass by means of a so-called POD method (plasma outside deposition) or by over-cladding with a fluorine-doped tube. The fluorine-doped layer has an effect on the light guiding characteristics in the cladding zone region, especially in cases where the cladding zone glass consists of a quartz glass having a higher refractive index.

In a preferred method variant, the composite preform is provided with an outer layer consisting of undoped quartz glass.

Due to its higher viscosity the outermost layer of undoped quartz glass stabilizes underlying quartz glass layers of a lower viscosity in subsequent method steps; it particularly counteracts deformations in hot deformation steps. The outer layer of undoped quartz glass can be applied by means of standard outside deposition methods or by overcladding with a quartz glass tube.

As for the blank, the above-indicated technical object starting from a blank of the aforementioned type is achieved according to the invention in that the wall thickness of the pump light layer is decreasing at an outer diameter of the cladding layer in the range of 3 mm to 50 mm with a mean cone angle between 25° and 80° along the output path, with the cladding layer reversely increasing with the same cone angle.

The further processing of the blank comprises at least a drawing process in which the core, the pump light layer and the cladding layer are elongated into "zones" of an optically active component which e.g. as a laser is present in the form of a rod, a tube or a fiber. Thus the optical component obtained after the elongation of the blank has a longitudinal axis, at least one cylindrical core zone which extends along the longitudinal axis and consists of an optically active material, a pump light zone extending along the core zone, from which pump light can pass along an output path into the core zone, and a cladding zone surrounding the pump light zone and having a lower refractive index than the pump light zone, with core zone, pump light zone and cladding zone constituting parts of a monolithic quartz glass body.

The formation of the zones of the component (or the "layers of the blank") from one and the same basic material, namely doped or undoped quartz glass, simplifies production and substantially avoids problems due to different thermal expansions. The zones are integral parts of the optically active component, so that there is no need for adjusting the zones relative to one another. The component consists of quartz glass, "quartz glass" also encompassing glass of a high silica content with a $SiO_2$ amount of at least 80%.

It is important that at least over a part of its length the blank has a pump light layer with a wall thickness decreasing in the direction of the injected pump light, and a cladding layer with a reversely increasing wall thickness as well as a cylindrical core.

The variable wall thickness gradient of the pump light layer is compensated by the reverse wall thickness gradient of the cladding layer such that an axially uniform total outer diameter of the blank is obtained. This facilitates the manufacture of a cylindrical component.

Light radiation is guided, produced and amplified, respectively, in the core zone of the component. The core zone directly or indirectly adjoins the pump light zone. The pump light zone extends along the core zone. The pump light zone is preferably configured such that it is suited for light conduction. This means that a multiple reflection inside the pump light zone is possible. Particularly, on its cladding surface facing the core zone, a "sudden downward change in the refractive index" may be provided, which means that a quartz glass layer of a smaller refractive index adjoins this cladding surface. In the final analysis the pump light guided in the pump light zone must pass into the core zone for exciting optically active substances, so that it can fulfill its intended purpose. To achieve this, it is provided according to the invention that at least over a partial length of the pump light zone, namely over the output path, the conditions for the reflection of the guided pump light change such that pump light passes in a defined manner gradually into the core zone. This effects a uniform activation of the optically active substances over the length of the corresponding output path and leads to a higher degree of efficiency of the injected pump light.

The blank is preferably obtained on the basis of the method explained in more detail above, with the "pump light layer" of the blank according to the invention being designated in the description of the method according to the invention by the more general term "inner zone". Reference is therefore made to these explanations.

The wall thickness of the pump light layer is decreasing (in the propagation direction of the pump light radiation). In the simplest case the wall thickness is linearly decreasing with a cone angle, resulting in a conical extension in the axial longitudinal section along the longitudinal axis of the blank. Other axial wall thickness profiles of the pump light layer are however also possible, e.g. with an exponential or stepwise decrease in the wall thickness in the direction of the cylinder axis of the component or a taper resembling a drawing bulb with a so-called taper form. Mean cone angle means here a cone angle that results from the linear connection between the points with maximum and minimum outer diameter and the axial distance of said points. As has already been explained above, the method according to the invention permits the formation of a particularly steep cone angle. At an outer diameter of the blank between 3 mm and 50 mm the mean cone angle according to the invention is between 25° and 80°. This means that he blank permits an elongation with a large draw ratio without the cone angle of the pump light zone becoming inefficiently flat for the out-coupling of pump light.

A larger cone angle makes it possible to couple out pump light via a relatively short output path without a high intensity of the pump light being needed in the area of the pump light input. The pump light power is coupled out as completely as possible over the length of the output path into the core zone. A long output path makes it easier to axially equalize the out-coupled pump light power. On the other hand the pump light in the pump light zone is subject to optical attenuation that is reduced by a steep cone angle in the area of the output path.

With a mean decrease in intensity of less than 1%/m there is a light guidance in the pump light zone over an output path with a length of more than 100 m for a complete out-coupling of the pump light, which—depending on the type of the optically active component and the pump light zone—can be accompanied by a noticeable loss due to optical attenuation of the pump light. Preferably, the light guided in the pump light zone is coupled out via the output path at an output rate that is marked by a mean decrease in intensity of not more than 10%/cm (based on the intensity value before the beginning of the output path). With a mean decrease in intensity of more than 10%/cm one obtains a light conduction in the pump light zone over an output path with a length of less than 10 cm, which is accompanied by a comparatively high mean intensity of the pump light coupled out into the core zone.

The radial geometry of the pump light layer may deviate from the circular cross-section and e.g. encompass oval, polygonal cross-sections and, particularly, radial cross-sections with a so-called "D-shape" (or D-shape at both sides, which is also designated as a "double-D-shape").

As for an efficient out-coupling of the pump light out of the pump light zone, one embodiment of the blank according to the invention is particularly preferred in which the pump light layer has, at least over a part of the output path, a radial cross-section which differs from the shape of a circular ring, particularly a radial cross-section in the form of a circular ring with at least one outer flattening.

The deviation from the circular ring shape effects a change in light conduction within the pump light zone in the optical component. Particularly, this prevents and changes light modes (so-called helical modes) that can only be coupled into the core zone with difficulty. The change in geometry of the pump light zone contributes in this respect to a more efficient out-coupling of the pump light. A simple and particularly effective geometrical change in comparison with a simple circular ring form is obtained in that the outer cladding of the pump light zone is plane-ground at a side or at several sides (which are preferably opposite), whereby one or more flattenings of the circular ring shape are formed. The embodiment with a flattening is also called "D-shape" in the literature, that with two opposite flattenings also "double-D-shape". The D-shape and the double-D-shape of the pump light zone have turned out to be particularly suited especially in combination with a tapering cross-sectional area of the pump light zone.

As for manufacturing costs that are as low as possible, plural output paths are provided over the length of the blank.

Each of the "output paths" serves the manufacture of an optically active component.

Furthermore, it has turned out to be useful when at least one core extends eccentrically next to the longitudinal axis.

Hence, the blank comprises one or more eccentrically arranged cores. When the optical component made therefrom is used as a laser, the eccentric arrangement of the core zone has advantages when pump light is coupled in, for the core zone is thereby shifted into a region of the component in which it is less hit by the pump light injected on the face side. This reduces the absorption of the pump light in the region of the in-coupling area. Moreover, an eccentric arrangement of the core zone can also be cooled more easily from the outside. Moreover, for instance in a double-core laser fiber the pump light is coupled on the face side into the fiber and is guided both in the core and in the pump cladding. Thus the fiber is subjected to great irregular stresses and the pump light is primarily absorbed near the input point because the intensity is here maximal. The absorbed power will then decrease exponentially with an increasing length. Using very long and low-doped active cores prevents a situation where the active core absorbs the pump light too much near the input point and the fiber is damaged by the evolving heat development or by an excessively high degree of inversion (photodarkening). These long fibers, however, are limited by non-linear effects such as SRS and SBS (stimulated Raman and Brillouin scattering) in their usability.

Further advantageous developments of the component according to the invention become apparent from the sub-claims. If designs of the component indicated in the sub-claims copy the procedures listed in sub-claims with respect to the method according to the invention, reference is made for supplementary explanation to the above statements on the corresponding method claims.

PREFERRED EMBODIMENTS

The invention is explained in more detail in the following with reference to embodiments and a drawing. In detail, in a schematic view.

Figure 1:
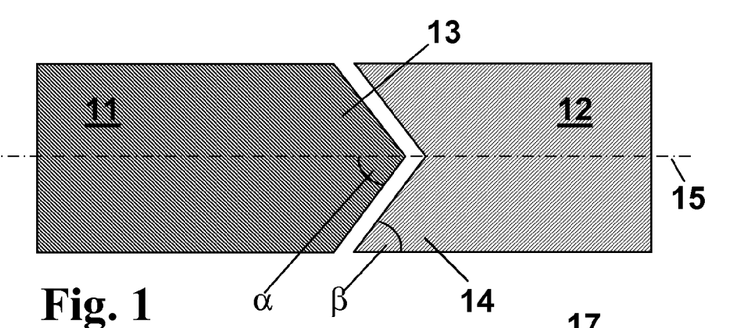
FIG. 1 shows the provision of preforms as a first method step in the manufacture of an optically active component in the form of a laser rod.

FIG. 1 schematically shows a first cylinder 11 of undoped quartz glass and a second cylinder 12 of a quartz glass doped with 4% by wt. of fluorine. The first cylinder has a face side ground in the form of a pointed cone 13. The second cylinder 12 has a face side into which a conical recess 14 has been milled. The outer diameter of both cylinders 11; 12 is the same and is 40 mm. The height of the pointed cone 13 and the depth of the conical recess 14 are also the same and are each 15.6 mm. The cone angle α (that is half the taper angle) is thus 52° and corresponds to the cone angle β of the conical recess 14.

The cylinders 11; 12 are clamped with opposing faces 13; 14 into the chuck of a lathe and adjusted relative to a joint central and rational axis 15.

Figure 2:
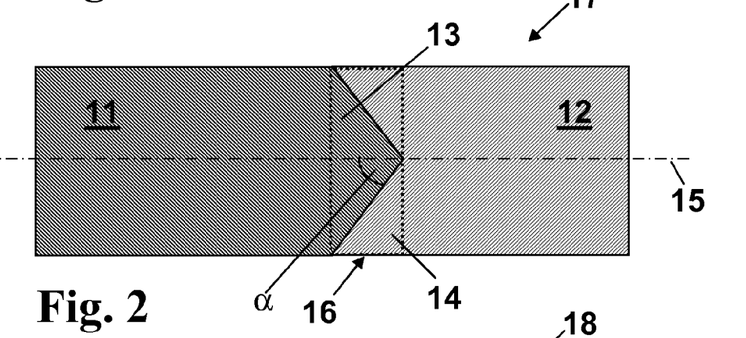
FIG. 2 shows the joining of the preforms on the face side with formation of a composite preform.

Subsequently the cylinders 11, 12 are pressed together along the central axis 15 to obtain a joined composite, so that the face ends 13; 14 get into contact with each other, as is schematically shown in FIG. 2. The joined composite 17 is heated in the contact area 16 marked by broken lines under rotation so that the face sides 13; 14 fuse with one another. On account of the fluorine doping the quartz glass of the second cylinder 12 is softer than that of the first cylinder 11.

A cylindrical melt composite 18 is thereby obtained in which the quartz glasses of first and second cylinder 11; 12 mutually penetrate into each other conically in contact area 16. The outer diameter of the melt composite 18 corresponds to that of the start cylinders 11, 12.

Figure 3:
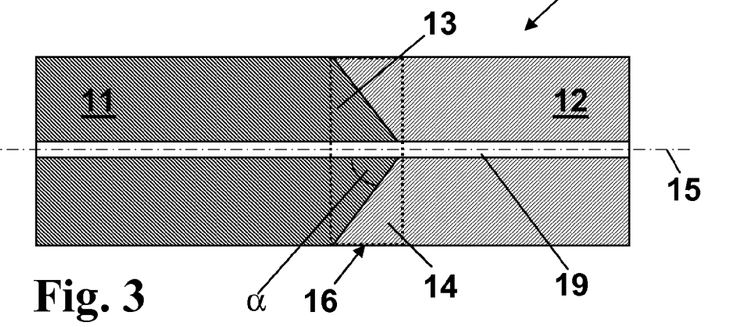
FIG. 3 shows the generation of a central inner bore in the composite preform.
Figure 4:
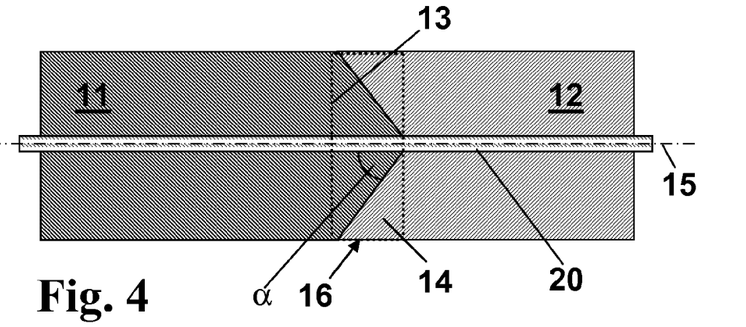
FIG. 4 shows the introduction of a core rod into the inner bore in the composite preform.

After cooling the melt composite 18 is provided with an inner bore 19, as is schematically shown in FIG. 3. The diameter of the inner bore 19 is 4 mm and serves to accommodate a core rod 20, as is schematically shown in FIG. 4. The core rod 20 consists either of a core glass with a radially homogeneous refractive index, or it consists of a core glass which is clad by one or several cladding glass layers with a different refractive index.

Figure 5:
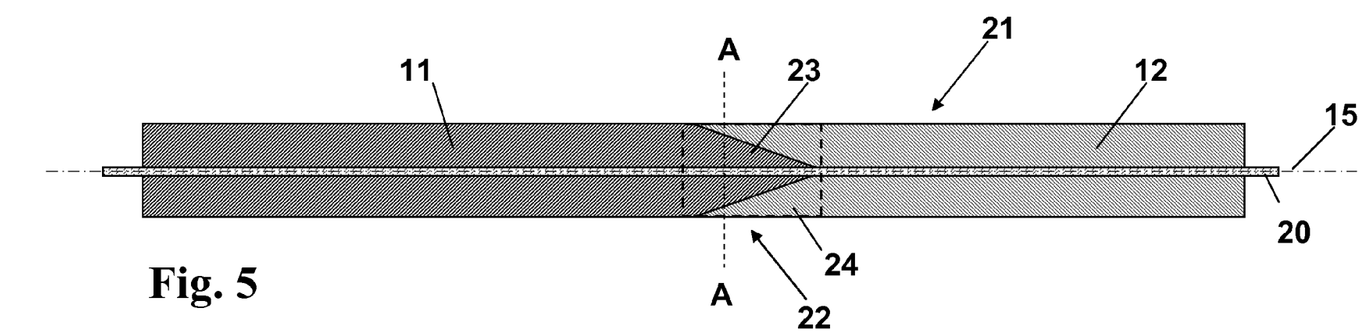
FIG. 5 shows the elongation of the composite preform with formation of a rod-shaped blank according to the invention with a cone region.

Subsequently, the melt composite 18 provided with the core rod 20 is uniformly elongated by zonewise heating into a rod 21 with an outer diameter of 1 mm. The original contact area 16 is here elongated into a cone structure 22 of a length of 25 m, as is schematically shown in FIG. 5. The cone structure 22 is composed of an inner zone 23 and a cladding zone 24. The diameter of the inner cylinder 23 is decreasing continuously from one end to the other end of the cone structure 22 and the diameter of the cladding zone 24 is reversely increasing over the same section. The desired optical component is obtained from the cone structure 22 in that the ends at both sides of the cone structure 22 are removed completely or in part. The sawn-off ends are waste in this case.

Figure 6:
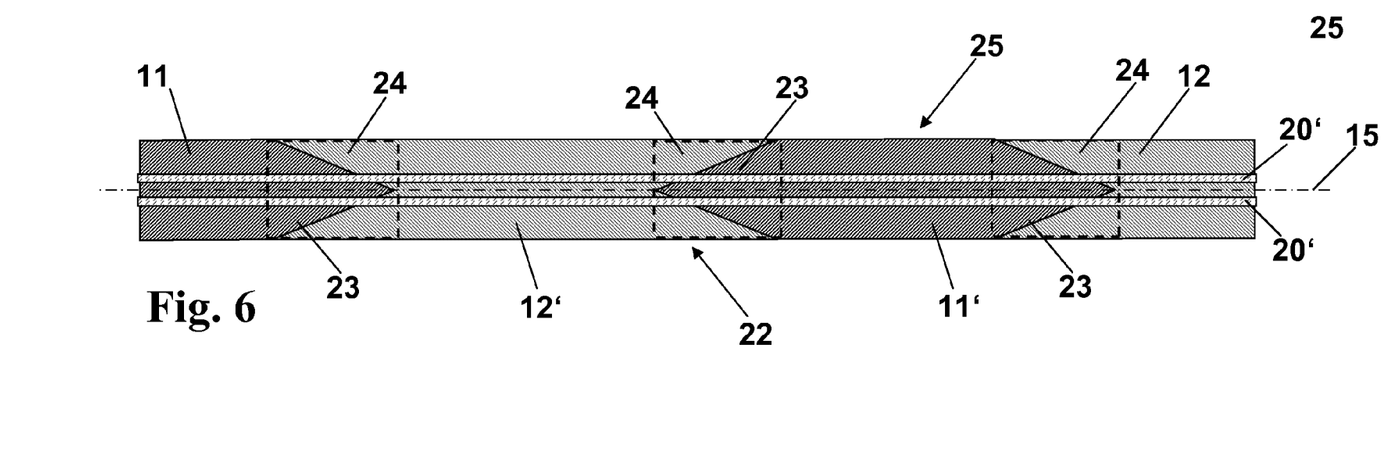
FIG. 6 shows a further embodiment of the blank according to the invention with a plurality of cone regions.

The amount of waste is reduced in the modified embodiment of the melt composite 25, as schematically shown in FIG. 6. Identical or equivalent components are here designated with the same reference numerals as in FIG. 5. A plurality of cone structures 22 are distributed over the length of the melt composite 25. These are formed by using modified cylinders 11'; 12' the two face sides of which are each formed as an external cone (11') and an internal cone (12'), respectively.

Moreover, two eccentrically arranged core rods 20' are provided. When the optical component made therefrom is used as a laser fiber, the eccentric arrangement of the core zone has advantages when pump light is coupled in, as has already been explained further above.

Figure 7:
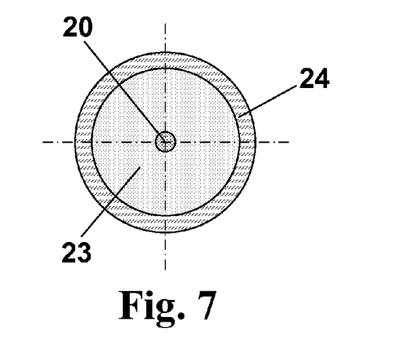
FIG. 7 shows a circular cross-sectional geometry in the cone region.

FIG. 7 schematically shows a radial cross-section along line "A" of the cone structure 22 of the component of FIG. 5. Identical or equivalent components are here designated with the same reference numerals as in FIG. 5. Inner zone 23 and cladding zone 24 are here given the shape of a circular ring.

Figure 8:
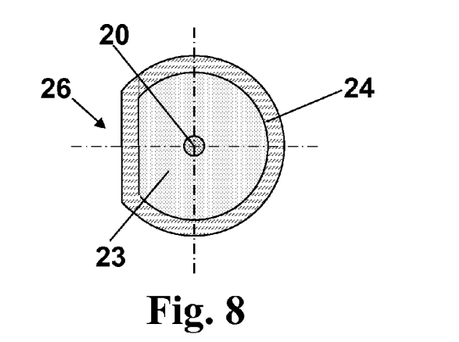
FIG. 8 shows a D-shaped cross-sectional geometry in the cone region.

By contrast, FIG. 8 schematically shows a radial cross-sectional area differing from the ring form, namely a contour with a so-called "D-shape" in which an outer cladding surface of the component is configured as a plane surface 26. This contour is formed in that the first preform 11 is provided with an outer cone which has a corresponding plane surface.

When the component is used as a side pumped laser, contours differing from the circular annular surface, which may e.g. be configured as a polygon, with D-shape or double-D-shape, star shape, flower shape, or the like, reduce the formation of helical rays which do not penetrate into the active core and are thus not available for pumping the same. The efficiency of the pump light is thereby improved.

Figure 9:
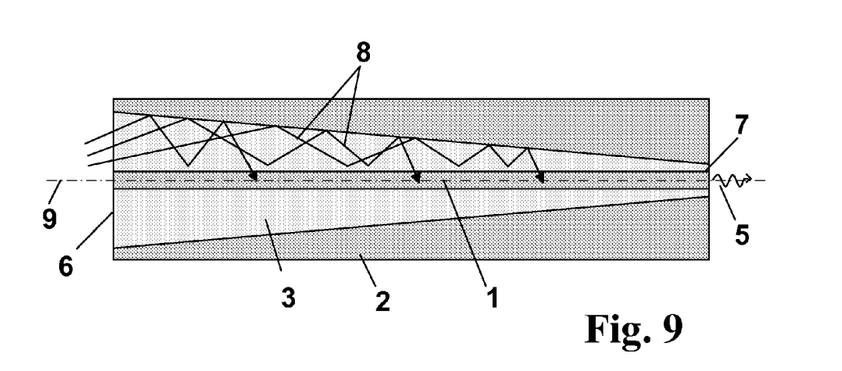
FIG. 9 shows a first embodiment of an optically active component obtained from the blank in the form of a cylindrical laser fiber with a pump light zone that is ring-shaped in radial cross-section and conical in axial cross-section, in a longitudinal section.

FIG. 9 schematically shows a longitudinal section through a laser fiber according to the invention. The laser active core 1 is made cylindrical and extends along the longitudinal axis 9. It is clad over its whole length by a pump cladding 3 and an outer cladding 2.

The core 1 consists of laser active quartz glass which is doped with 0.25 mol % $Yb_2O_3$ and with 1.0 mol % $Al_2O_3$. The refractive index of the core quartz glass is slightly higher than that of undoped quartz glass. It has a diameter of 0.1 mm. In the laser active core 1 the laser radiation 5 to be emitted is produced by optical pumping via the pump cladding 3.

The pump cladding 3 consists of undoped quartz glass. The pump cladding 3 is made conical, the thickness thereof continuously decreasing over a length of 20 m from the input face side 6 for the pump light 8 up to the output face side 7 for the laser light from 1 mm to 100 μm. The cone angle is thus about 0.02 mrad.

The outer cladding 2 surrounding the pump cladding 3 consists of quartz glass which is doped with 4% by wt. of fluorine and which has a refractive index which is lower by $14 \times 10^{-3}$ than undoped quartz glass. The lower refractive index of the outer cladding 2 prevents pump light 8 from exiting out of the pump cladding 3. The outer cladding 2 is made reversely conical with respect to the pump cladding 3. Its thickness is continuously increasing from 10 μm to 1 mm over a length of 20 m from the input face side 6 for the pump light 8 up to the output face side 7 for the laser light. This yields an altogether cylindrical shape of the laser fiber.

The pump light 8 is coupled in at the input side 6 (via the larger one of the two circular end faces 6 of the pump cladding 3). The NA (numerical aperture) of the in-coupled pump light is here adapted to the NA of the pump cladding 3 such that a uniform input of the pump light 8 over the full length of the core 1 is accomplished. The pump light 8 can here irradiate the end face 6 fully or only partly. Preferably, the pump light 8 is injected into the pump cladding 3 such that the region of the active core area is not acted upon by pump light 8 or is only acted upon as little as possible.

The pump light 8 is guided in the pump cladding 3 until the condition for total reflection is no longer satisfied and the pump radiation 8 can penetrate into the core 1. Due to the conical shape of the pump cladding 3 an increasingly steeper reflection angle is accomplished upon each reflection on the boundary relative to the outer cladding 2. If the reflection angle gets too steep after several reflections, the pump radiation 8 can penetrate into the core 1 and start a population inversion in the active core 1, resulting in the laser emission 5 in case of an adequately high excitation power.

The light conduction in the pump cladding 3 can be improved when the core 1 is clad by a thin inner cladding layer having a refractive index smaller than that of the pump cladding. In this case the refractive index of the outer cladding 2 is preferably chosen such that it is lower than that of the inner cladding layer. This prevents the pump light 8 from exiting towards the outer cladding 2.

In an alternative embodiment the pump cladding 3 has a curvature not linearly tapering towards the output end 7 instead of a conical configuration linearly tapering towards the output end 7. Such a curvature is e.g. obtained during elongation of a glass cylinder in the form of a drawing bulb or a so-called taper.

The length of the optically active component may range from a few cm to a few meters. The diameter is typically in the range of 0.2 mm to 10 mm. In the embodiment the laser fiber has a length of 20 m and this also corresponds to the length of the output path.

Figure 10:
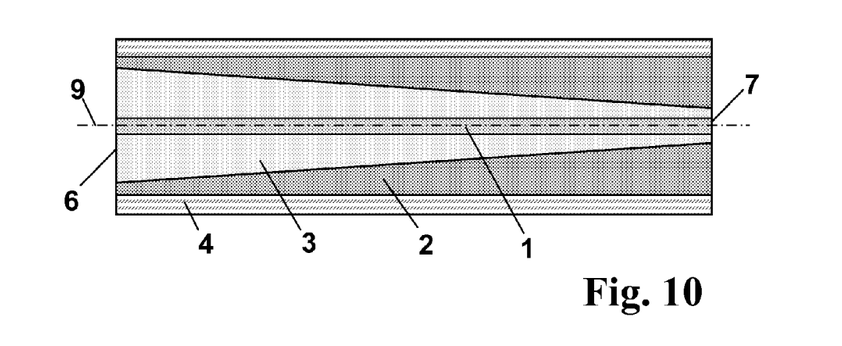
FIG. 10 shows a second embodiment of an optically active component in the form of a cylindrical laser fiber in a longitudinal section.

In the embodiment shown in FIG. 10, the laser according to the invention is present in the form of a fiber that corresponds to the embodiment of FIG. 1 with respect to core 1, conical pump cladding 3 and counter-conical outer cladding 2. The outer cladding 2 is additionally surrounded by a stabilization layer 5 of undoped quartz glass. The fiber has a uniform outer diameter on the whole.

Figure 11:
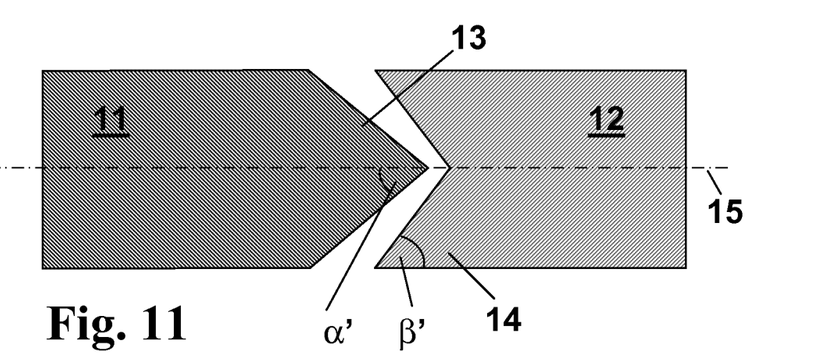
FIG. 11 shows a further variant of providing and joining preforms in the manufacture of an optically active component.
Figure 12:
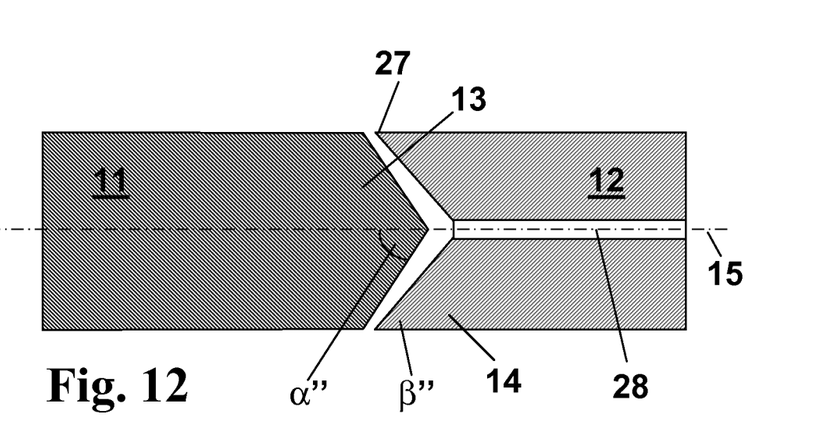
FIG. 12 shows a further variant of providing and joining preforms in the manufacture of an optically active component.

The following FIGS. 11 and 12 show schematic modifications of the method step shown in FIG. 1. If identical reference numerals are used as in FIG. 1, these designate identical or equivalent components or parts.

In the embodiment according to FIG. 11, it is intended that the cylinder 11 is provided on the face side with an external cone 13 having a cone angle α' smaller than the cone angle β' of the conical recess 14 of the other cylinder 12 on the face side. When the cylinders 11, 12 are joined, a first contact is therefore established in a defined and reproducible manner between the cone tips and the bottom of the recess 14. Starting from the bottom of the recess 14, the contacting front is migrating from the inside to the outside. Gases can therefore escape from the gap between the face sides of the cylinder 11, 12 until the end.

In the embodiment according to FIG. 12 it is intended that the cylinder 11 is provided on the face side with an external cone 13 having a cone angle α" greater than the cone angle β" of the conical recess 14 of the other cylinder 12 on the face side. The cylinder 12 made of the cladding zone glass is further provided with a vent bore 28 which extends in the longitudinal axis and terminates at the bottom of the recess 14. When the cylinders 11, 12 are joined, the cladding surface of the external cone 13 first contacts the surrounding outer edge 27 of the recess 14 in a defined and reproducible manner. This contact effects a sealing of the remaining gap between the face sides of the cylinders 11; 12. The gas from this gap is sucked off via the vent hole 28 and a vacuum is subsequently maintained. Starting from the outer edge 27, the contacting front is migrating from the outside to the inside. Gases can thus escape from the gap between the face sides of the cylinders 11,12 via the vent bore 28 until the end. The vent bore 28 is then prepared and used for accommodating a core rod.

Figure 13:
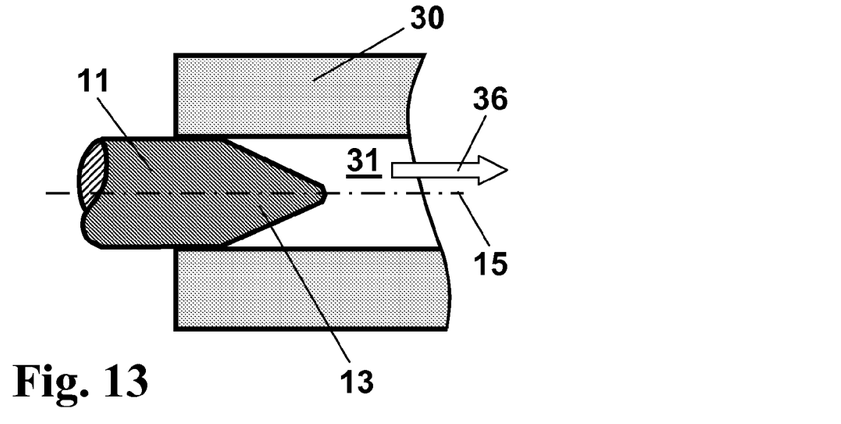
FIG. 13 shows a further variant of providing preforms in the manufacture of an optically active component.

FIG. 13 schematically shows a first cylinder 11 of undoped quartz glass and a second tubular cylinder 30 of quartz glass which is doped with 4% by wt. of fluorine. The first cylinder 11 has a face side which is ground in the form of a cone 13 with rounded-off cone tip. The cone angle is about 35°. The outer diameter of the first cylinder 11 is 40 mm and is adapted to the diameter of the inner bore 31 (41 mm).

The cylinders 11; 12 are clamped in the chuck of a lathe and adjusted to a joint central and rotational axis 15. Subsequently, the first cylinder 11 is introduced into the inner bore 31 to such an extent that the cylinder outer surface abuts on the inner wall of the inner bore.

The joined composite produced in this way is heated in the contact area under rotation, so that the tubular cylinder 30 is first collapsed onto the outer cladding of the cylinder and fuses therewith. Due to fluorine doping the quartz glass of the second cylinder 30 is softer than the quartz glass of the first cylinder 11.

Figure 14:
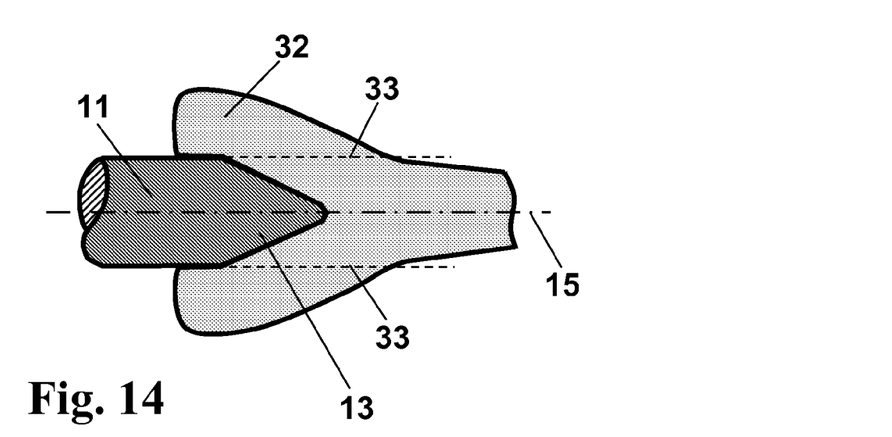
FIG. 14 shows the joining of the preforms of FIG. 13 on the face side with formation of a composite preform with an outer bead.

Subsequently, a negative pressure is applied via the inner bore 31 and maintained, as outlined by the block arrow 36. The tubular cylinder 30 collapses onto the external cone 13. The cylinder 30 can here be drawn off into an elongated solid cylinder in a supportive measure, as is schematically shown in FIG. 14. A surrounding outer bead 32 from the cladding zone remains in this case and is subsequently ground along the lines 33.

Figure 15:
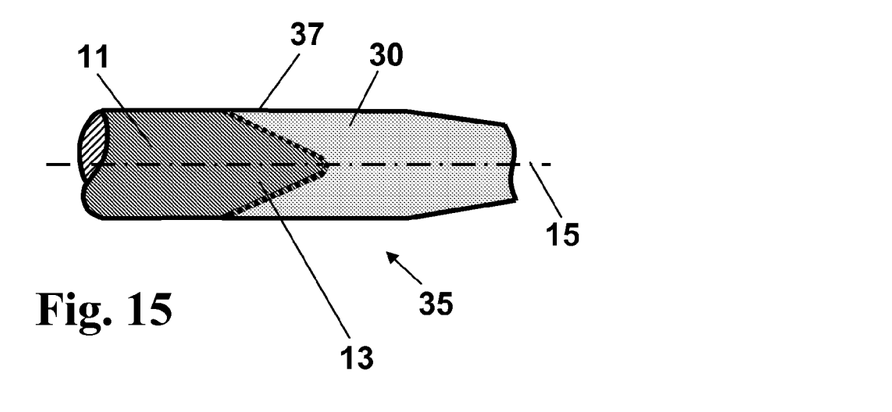
FIG. 15 shows the quartz glass blank obtained after grinding off the outer bead of the composite preform of FIG. 14.

A substantially cylindrical blank 35 according to FIG. 15 is thereby obtained which in a contact area 37 comprises a conically tapering inner zone 13 and a reversely conically expanding cladding zone. The contact area is further processed into an optical component, as has been explained further above.

The invention claimed is:

1. A method of producing a cylindrical optical component of quartz glass that has an inner zone extending in the direction of a longitudinal axis and of an inner zone glass, wherein said inner zone is clad by a cladding zone of a cladding zone glass, the cladding zone having a mean wall thickness varies over at least part of a length thereof in the direction of the longitudinal axis of the component, said method comprising:
   (a) providing a first preform of the inner zone glass, the first preform comprising a contact area shaped in the form of an external cone on a face side thereof;
   (b) providing a second preform of the cladding zone glass;
   (c) embedding the contact area shaped in the form of an external cone in the cladding zone glass and welding the contact area to the cladding zone glass so as to form a composite preform that, in the contact area, comprises a conical inner-zone area of the inner zone glass that is surrounded by a cladding zone area with an internal cone shape; and
   (d) elongating the composite preform so as to obtain the optical component or a pre-product of the component.

2. The method according to claim 1, wherein the second preform comprises a second contact area, and the composite preform is formed by a joining of the first and second contact areas.

3. The method according to claim 2, wherein, during the joining of the first and second contact areas, a space between the first and second contact areas is evacuated.

4. The method according to claim 2, wherein the contact area of the second preform has a recess that is shaped as an internal cone.

5. The method according to claim 4, wherein the second preform has a surrounding edge around the recess and the external cone of the first preform has a cone cladding, and, when the two preforms are pressed together, the cone cladding of the first preform forms a seal with the surrounding edge of the second preform.

6. The method according to claim 4, wherein the recess is produced by mechanical treatment.

7. The method according to claim 4, wherein the recess is formed by a hot forming process.

8. The method according to claim 1, wherein the cladding zone glass is a fluorine-doped quartz glass.

9. The method according to claim 1, wherein the first preform and the second preform are each configured as cylinders.

10. The method according to claim 1, wherein the contact area of the first preform that is shaped as an external cone is produced by mechanical treatment.

11. The method according to claim 1, wherein the contact area of the first preform that is shaped as an external cone is produced by a hot forming process.

12. The method according to claim 1, wherein the contact area of the first preform that is shaped as an external cone is provided with a rounded-off cone tip.

13. The method according to claim 1, wherein the inner zone glass is quartz glass that is undoped.

14. The method according to claim 1, wherein, during pressing together, the second preform is softened in the second contact area.

15. The method according to claim 1, wherein prior to elongation the composite preform is provided with at least one inner bore configured to receive a core rod, and a core rod is placed therein.

16. The method according to claim 1, wherein prior to elongation the composite preform is clad with a layer consisting of fluorine-doped quartz glass.

17. The method according to claim 1, wherein the composite preform is provided with an outer layer consisting of undoped quartz glass.

18. The method according to claim 1, wherein the composite preform has a plurality of contact areas succeeding one another in an axial direction.

* * * * *